(12) United States Patent
Tardif

(10) Patent No.: US 8,091,815 B2
(45) Date of Patent: Jan. 10, 2012

(54) PLATFORM FOR A PORTABLE VACUUM AND SHREDDER APPARATUS

(76) Inventor: Leo Tardif, Repentigny (CA)

( * ) Notice: Subject to any disclaimer, the term of this patent is extended or adjusted under 35 U.S.C. 154(b) by 49 days.

(21) Appl. No.: 12/848,123

(22) Filed: Jul. 31, 2010

(65) Prior Publication Data

US 2010/0294867 A1    Nov. 25, 2010

(30) Foreign Application Priority Data

Sep. 2, 2009 (GB) .................................. 0915261.2

(51) Int. Cl.
B02C 23/18    (2006.01)

(52) U.S. Cl. ............ 241/100; 241/101.763; 241/101.78; 241/285.1

(58) Field of Classification Search .................. 241/100, 241/55, 56, 285.1, 101.763, 101.78; 15/347, 15/352, 360, DIG. 8; 55/DIG. 2

See application file for complete search history.

(56) References Cited

U.S. PATENT DOCUMENTS

| | | | | |
|---|---|---|---|---|
| 3,190,566 | A | * | 6/1965 | Cressy et al. .................. 241/56 |
| 3,861,603 | A | * | 1/1975 | Lautzenheiser et al. ...... 241/100 |
| 4,117,983 | A | * | 10/1978 | Browning ........................ 241/55 |
| 4,143,823 | A | * | 3/1979 | Judson, Jr. ....................... 241/73 |
| 4,567,623 | A | | 2/1986 | Walton |
| 5,474,241 | A | * | 12/1995 | Kennedy ......................... 241/81 |
| 5,707,017 | A | | 1/1998 | Paolucci et al. |
| 5,722,110 | A | | 3/1998 | McIntyre et al. |
| 6,574,829 | B1 | | 6/2003 | Marcum et al. |
| 7,257,858 | B2 | | 8/2007 | Palazzolo |
| 7,506,403 | B2 | | 3/2009 | Svoboda et al. |
| 2008/0295280 | A1 | | 12/2008 | Goodger |

FOREIGN PATENT DOCUMENTS

GB    666971    2/1952

* cited by examiner

*Primary Examiner* — Mark Rosenbaum

(57) ABSTRACT

A platform for securing a portable vacuum and shredder apparatus has brackets for attaching a shredder onto the platform. A vacuum tube for the ingress of matter to be shredded. An ingress opening for the shredded matter. A closed area, or bag for collecting the shredded material. An air exhaust fitted with a filter system or device allowing for air exhaust while the shredded material is retained in the closed collecting area, or bag.

16 Claims, 6 Drawing Sheets

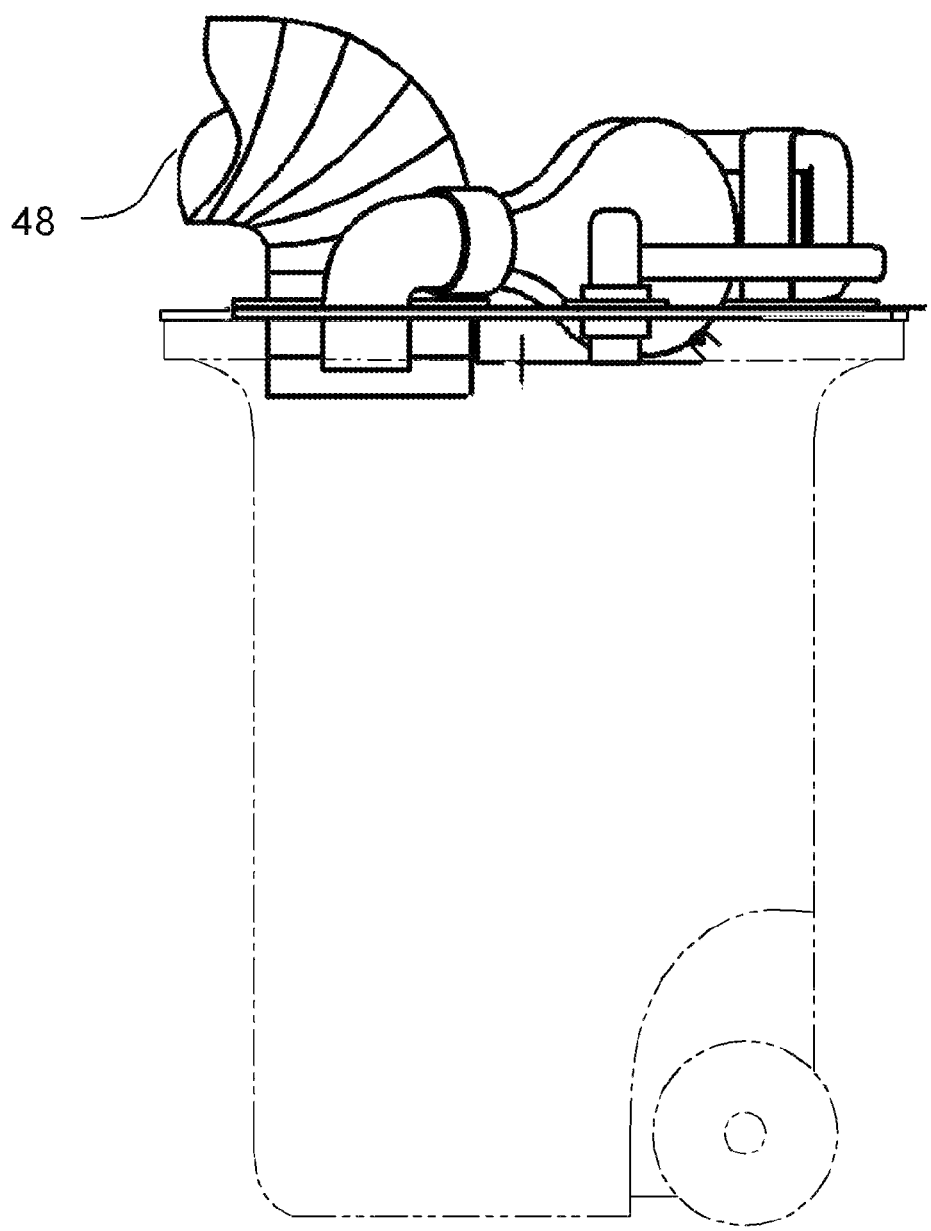

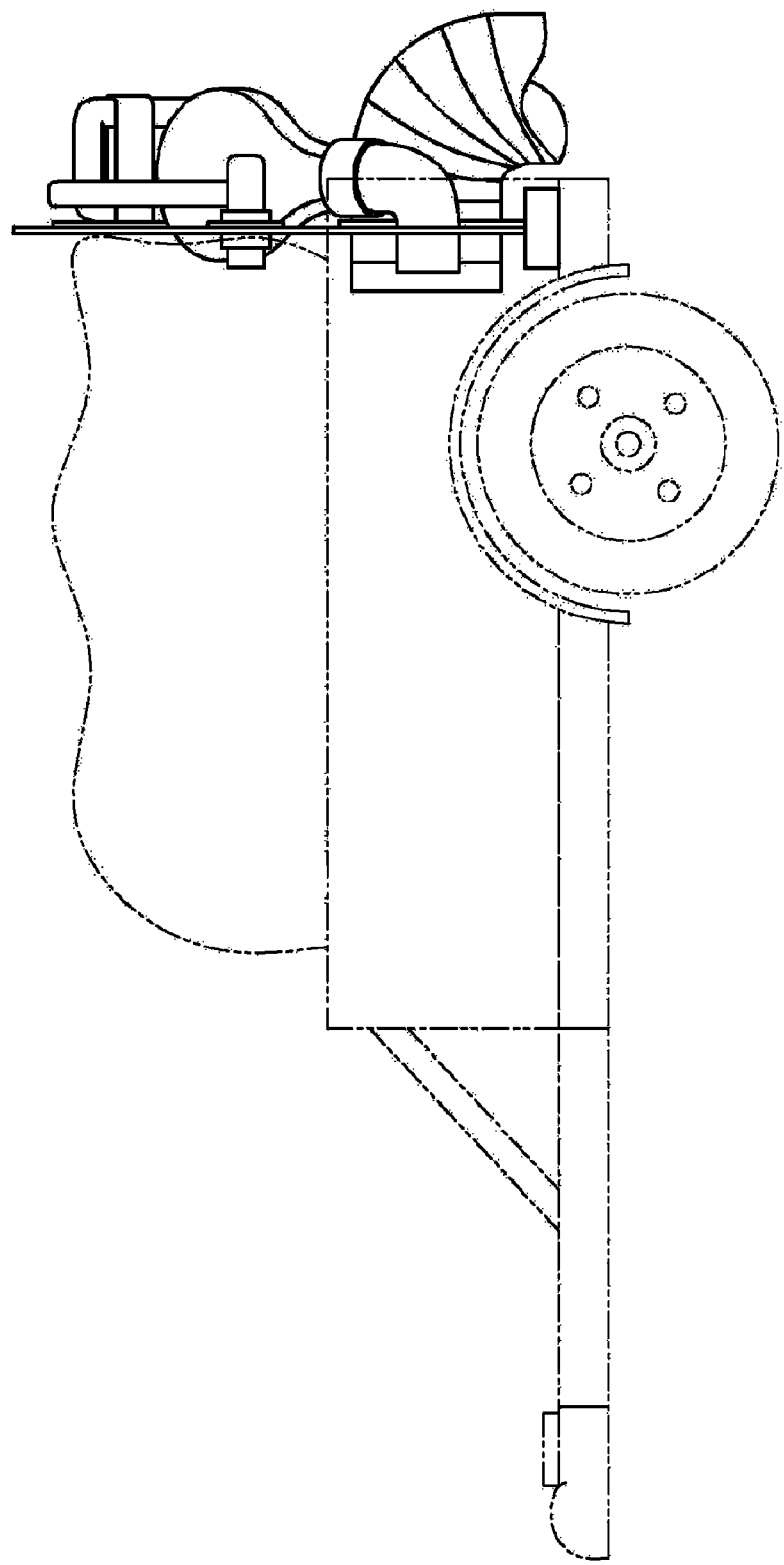

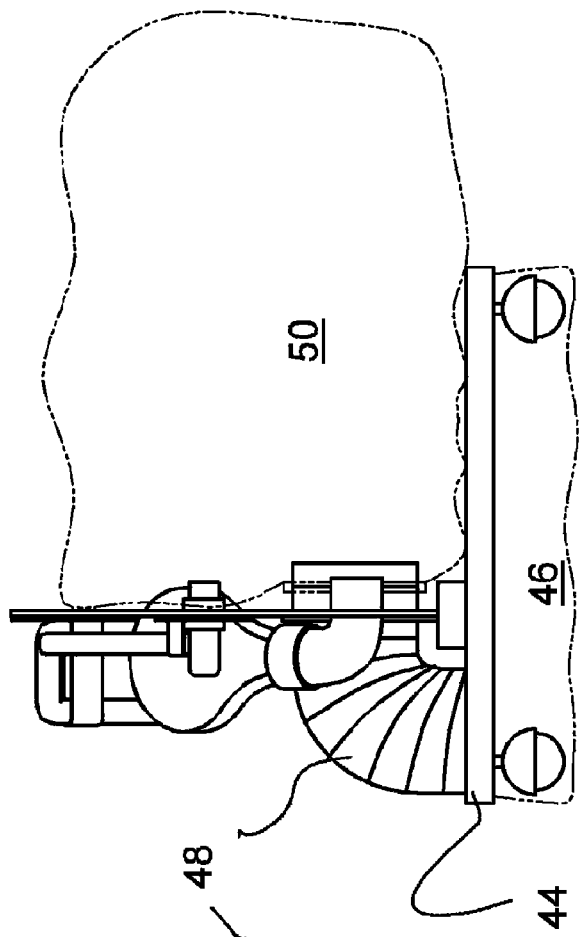
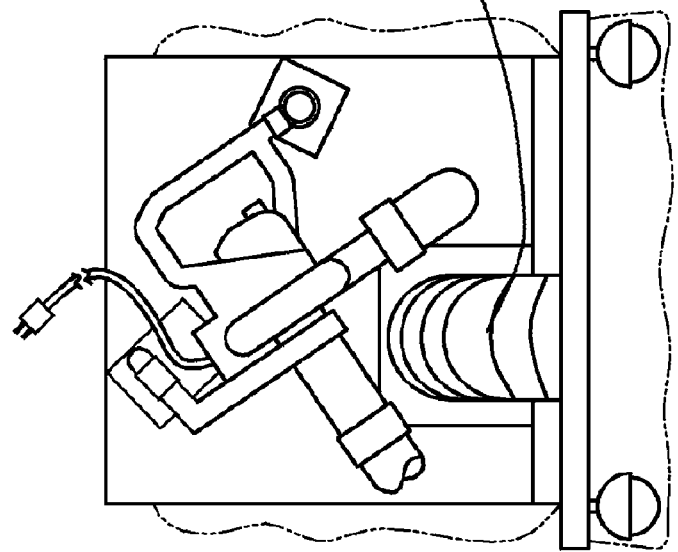
*Fig. 6b*
*Fig. 6a*

PLATFORM FOR A PORTABLE VACUUM AND SHREDDER APPARATUS

FIELD OF THE INVENTION

The present invention relates generally to vacuuming and shredding devices but more particularly to a device which carries a portable vacuum and shredder apparatus over various types of containers.

BACKGROUND OF THE INVENTION

There exist various types of motorized gardening tools, including blowers, vacuums, and shredders. These devices need to be held by or carried on the back of, or on a shoulder strap on the user. Also, in the case of shredders and vacuums, there is a need for some sort of container such as a bag, a barrel, a trailer or a wheelbarrow that can contain the shredded matter. Such container is often unwieldy or impractical to carry along while performing the vacuuming operation.

SUMMARY OF THE INVENTION

In view of the foregoing disadvantages inherent in the known devices now present in the prior art, the present invention, which will be described subsequently in greater detail, is to provide objects and advantages which are:

To provide for a practical device that can attach a shredder to a variety of devices.

Another advantage is to allow the user to simply move a tube that can be easily maneuvered around bushes, rocks, tree trunks or any such impediment common in yard work.

To attain these ends, the present invention generally comprises at least two brackets located on an upper surface of the platform and comprised of a combination of at least two of any of the followings: one bracket being adapted to hold a portion of a vacuum tube of the portable vacuum and shredder apparatus, a second bracket being adjustable and adapted to hold a second portion of the portable vacuum and shredder apparatus, and a third bracket adapted to hold a separate portion of the portable vacuum and shredder apparatus, to thereby be adapted to securely and removably hold the portable vacuum and shredder apparatus to the platform; the platform further comprising an ingress opening adapted for allowing the passage of shredded matter to pass from the portable vacuum and shredder apparatus to a collection member.

The platform further comprises a frame member removably connected to the platform, the frame member includes a top frame portion, a bottom frame portion, and a vertical frame portion connected between the top and bottom frame portions; and at least one releasable attachment member connected to the vertical frame portion and adapted to releasably attach the platform to a transportation member.

The platform further comprises an exhaust opening adapted to receive an exhaust tube for allowing air to flow from the collection member out through the exhaust opening; and an exhaust tube fitted within the exhaust opening and including a filter member therein to allow air to pass therethrough without shredded material therein.

The platform further comprises an air cushion support including an opening adapted to have the exhaust tube fitted therein and allow air from the portable vacuum and shredder apparatus to pass therethrough forming an air cushion zone between the air cushion support and a ground surface.

The platform further includes a plurality of wheels between the air cushion support and the ground surface.

A combination of a portable vacuum and shredder apparatus and an apparatus for integrating the portable vacuum and shredder apparatus with a collection system, the combination comprising a portable vacuum and shredder apparatus including a vacuum, a vacuum tube, a shredder, and a shredder tube; and an apparatus for integrating the portable vacuum and shredder apparatus with a collection system comprising a platform including at least two of three brackets located on an upper surface of the platform, one bracket being adapted to hold a portion of a vacuum tube of the portable vacuum and shredder apparatus, a second bracket being adjustable and adapted to hold a second portion of the vacuum tube of the portable vacuum and shredder apparatus, and a third bracket adapted to hold a separate portion of the portable vacuum and shredder apparatus, to thereby securely and removably hold the portable vacuum and shredder apparatus to the platform; the platform further comprising an ingress opening adapted for allowing the passage of shredded matter to pass from the portable vacuum and shredder apparatus to a collection member.

A combination of a portable vacuum and shredder apparatus, an apparatus for integrating the portable vacuum and shredder apparatus to a collection system, and a collection system, the combination comprising a portable vacuum and shredder apparatus including a vacuum, a vacuum tube, a shredder, and a shredder tube; an apparatus for integrating the portable vacuum and shredder apparatus to a collection system comprising at least two of three brackets located on an upper surface of the platform, one bracket being adapted to hold a portion of a vacuum tube of the portable vacuum and shredder apparatus, a second bracket being adjustable and adapted to hold a second portion of the vacuum tube of the portable vacuum and shredder apparatus, and a third bracket adapted to hold a separate portion of the portable vacuum and shredder apparatus, to thereby securely and removably hold the portable vacuum and shredder apparatus to the platform; the platform further comprising an ingress opening adapted for allowing the passage of shredded matter to pass from the portable vacuum and shredder apparatus to a collection member; and a collection system removably attached to a lower surface of the platform and comprising a collection member adapted to collect and retain shredded material therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 3 Side view of the invention installed on a bin where the bin itself is used to collect the shredded matter or a standard garbage bag is installed inside the bin to collect the shredded matter.

FIG. 5 Side view of an alternate embodiment of there invention on a trailer when a standard garbage bag mounted horizontally is used to collect the shredded matter.

FIG. 6a-b Front and side views, respectively, of the invention on an air cushion platform with a garbage bag collecting the shredded matter is mounted horizontally. An alternate embodiment can be achieved where the garbage bag is mounted vertically.

DETAILED DESCRIPTION OF THE PREFERRED EMBODIMENT

Figure 1A:
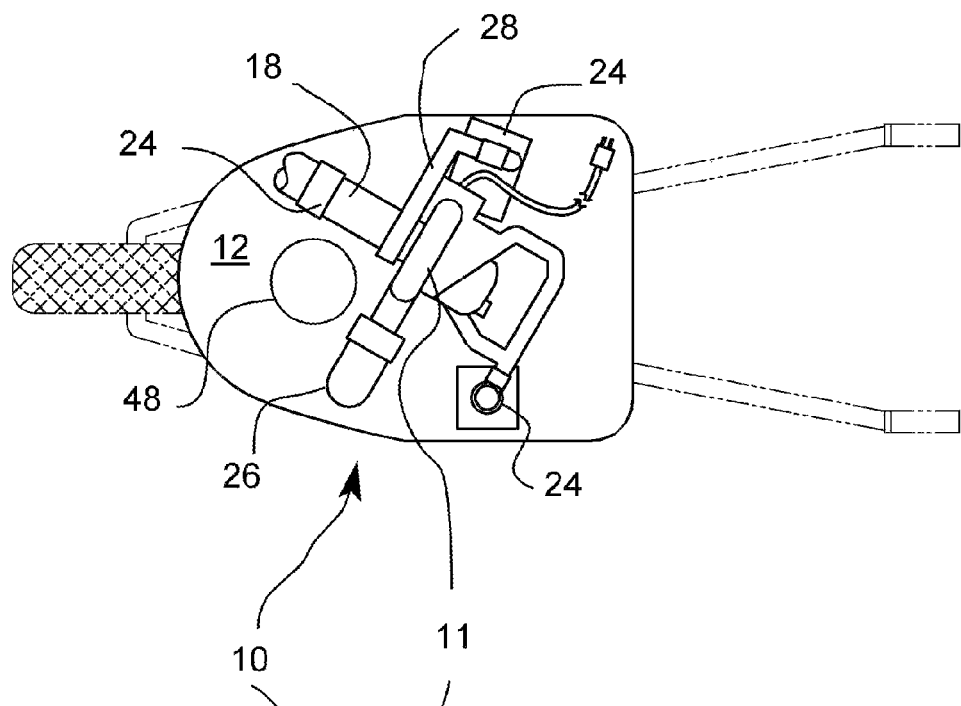
FIGS. 1a-b Top and side views, respectively, of the invention on a wheelbarrow where the wheelbarrow bucket is used to collect the shreeded matter.
Figure 1B:
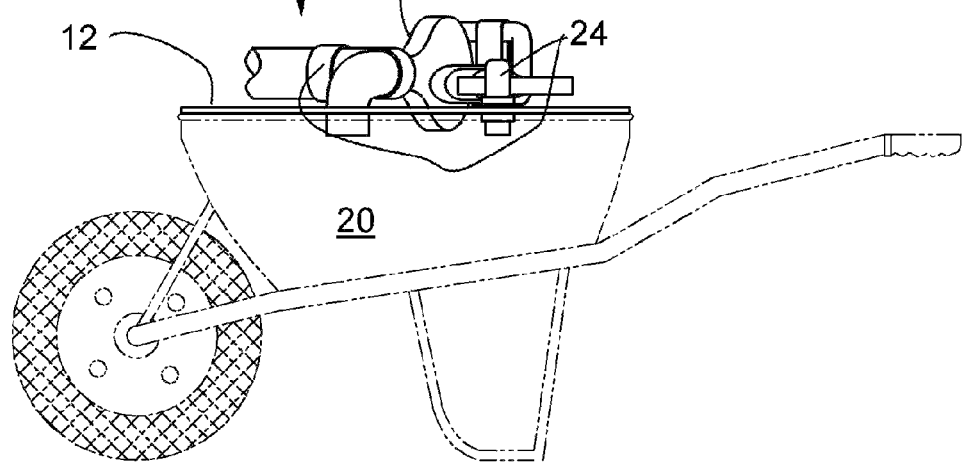
Figure 2A:
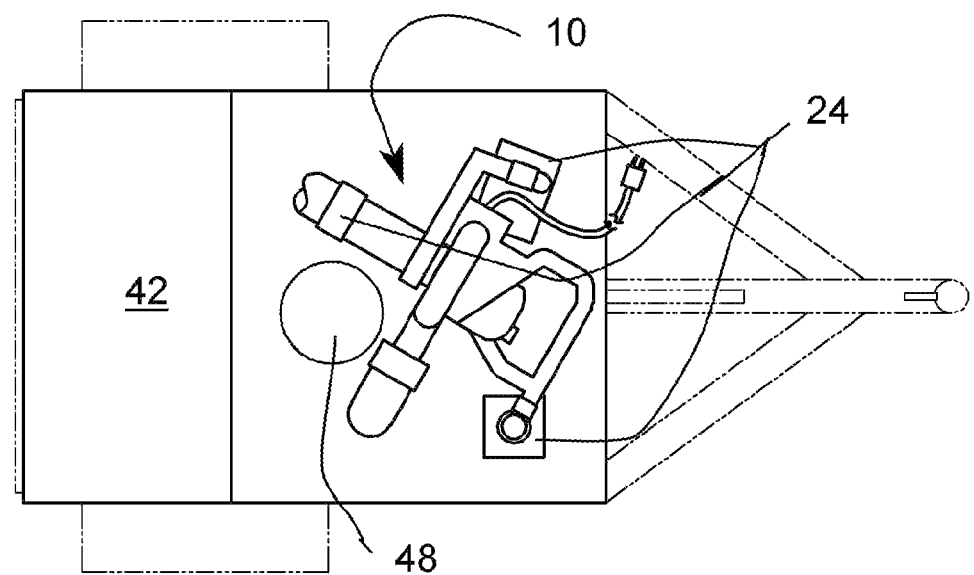
FIGS. 2a-b Top and side views, respectively, of the invention on a trailer where the trailer box is used to collect the shredded matter.
Figure 2B:
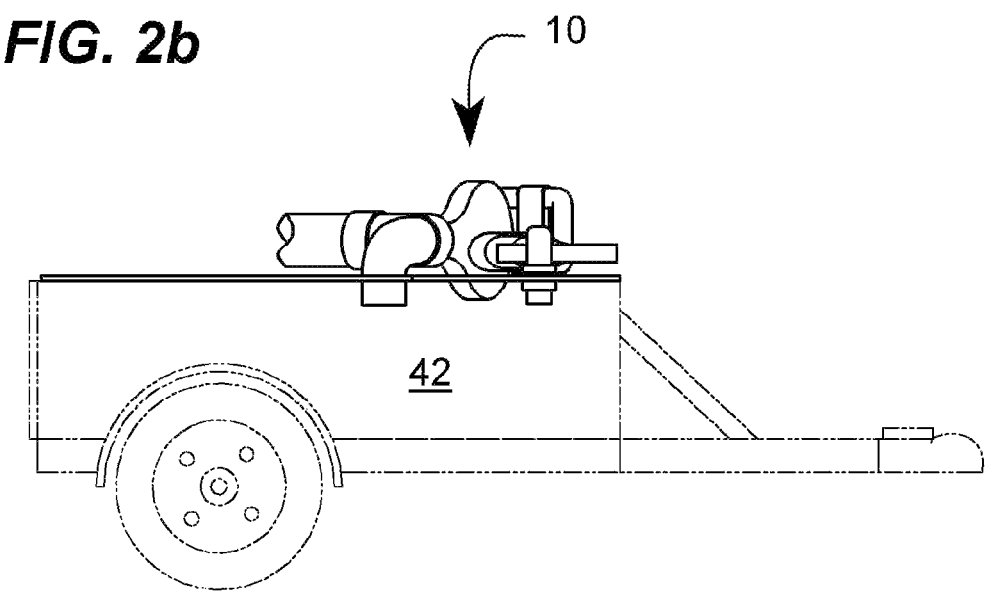
Figure 4:
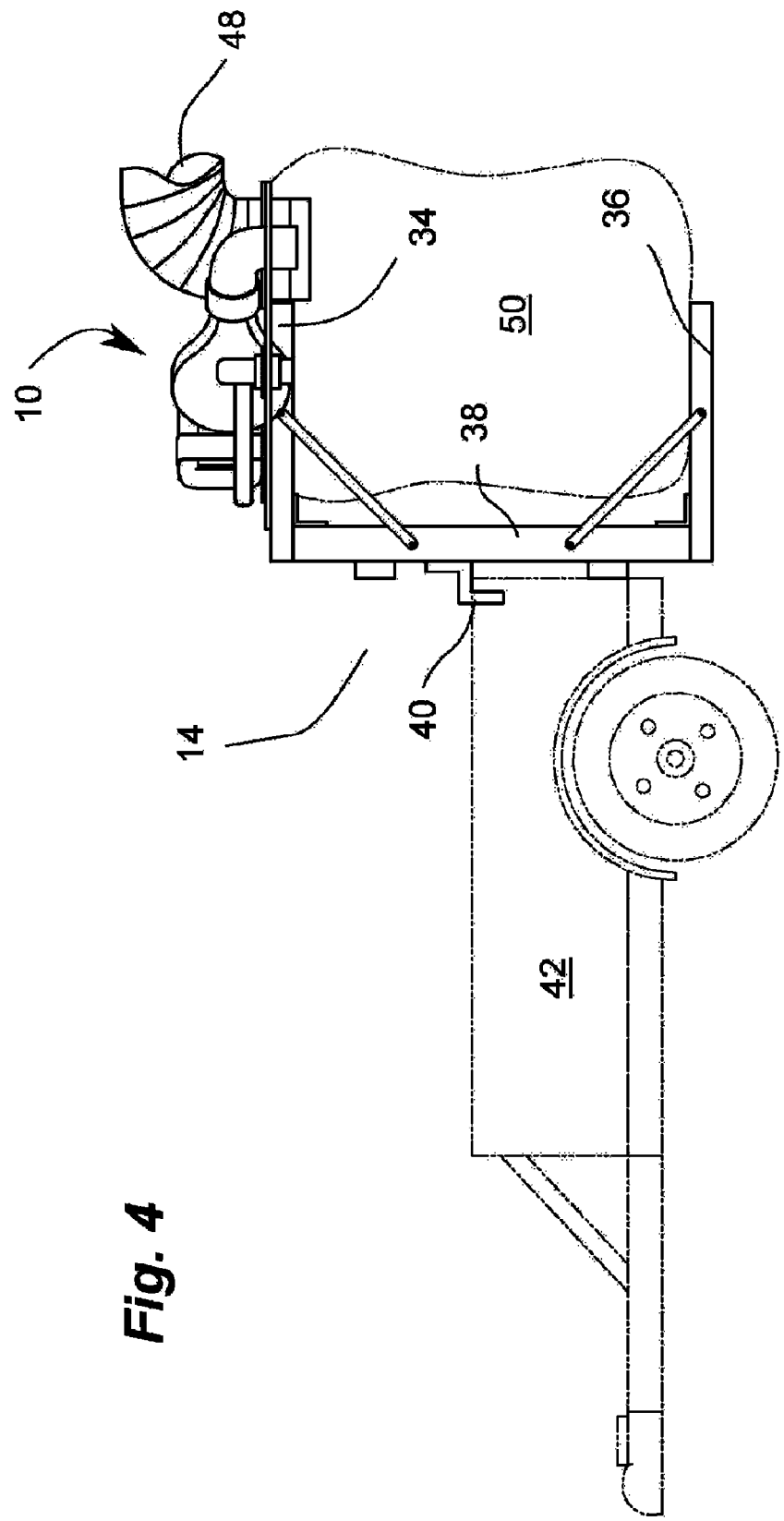
FIG. 4 Side view of the frame structure used on a trailer when a standard garbage bag mounted vertically is used to collect the shredded matter.

A platform (10) for a portable vacuum and shredder apparatus (11) is configured and sized so that it can be used on a wheelbarrow (20) or a trailer (42), or a bag (50) as well as for a bag (50) supported on an air cushion support (44). For example, FIG. 1 shows the platform (10) configured to fit over a wheelbarrow (20), while FIG. 2 shows the platform (10) on a trailer (42), FIG. 4 shows a frame structure (14) for holding a bag (50), and FIG. 6 shows an air cushion support (44).

All configurations have the platform (10) having a set of brackets (24) for attaching a shredder (11). For ergonomic reasons, there are very few differences between various makes and models of vacuum and shredder apparatus (11) so that the brackets (24) can easily be adapted for fitting. A vacuum tube (18) sucks in matter to be shredded. An ingress opening (26) for the shredded matter is made through the platform (10). The vacuum tube (18) for the ingress of matter to be shredded is attached to a tube bracket (28). An exhaust tube (48) fitted with a filter system or device allowing for air exhaust while the shredded material is retained in a bag (50), wheelbarrow (20) or trailer (42).

A frame structure (14) has a top frame (34) and a bottom frame (36), both being perpendicularly attached to opposite ends of a vertical frame (38). The frame structure (14) has an attachment bracket (40) which allows the frame structure (14) to be attached to any of a variety of objects, including a trailer (42).

The frame structure (14) holds the platform (10) on its top frame (34) and the bag (50) into which the shredded material is collected, hanging therebelow, down to the bottom frame (36).

FIG. 6 shows an air cushion support (44) with the air exhaust tube (48) which feeds the air, after filtration, from the bag (50) to an air cushion zone (46).

All embodiments have the exhaust tube (48) fitted with a filter and which allows the bag (50) to be made out of an impermeable polymer such as those used for garbage plastic bags.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A platform for a portable vacuum and shredder apparatus comprising at least two of three brackets located on an upper surface of said platform, one bracket being adapted to hold a portion of a vacuum tube of said portable vacuum and shredder apparatus, a second bracket being adjustable and adapted to hold a second portion of said vacuum tube of said portable vacuum and shredder apparatus, and a third bracket adapted to hold a separate portion of said portable vacuum and shredder apparatus, to thereby be adapted to securely and removably hold said portable vacuum and shredder apparatus to said platform; said platform further comprising an ingress opening adapted for allowing the passage of shredded matter to pass from said portable vacuum and shredder apparatus to a collection member.

2. The platform of claim 1, wherein said platform further comprises a frame member removably connected to said platform, said frame member includes a top frame portion, a bottom frame portion, and a vertical frame portion connected between said top and bottom frame portions; and at least one releasable attachment member connected to said vertical frame portion and adapted to releasably attach said platform to a transportation member.

3. The platform of claim 1, wherein said platform further comprises an exhaust opening adapted to receive an exhaust tube for allowing air to flow from said collection member out through said exhaust opening; and an exhaust tube fitted within said exhaust opening and including a filter member therein to allow air to pass therethrough without shredded material therein.

4. The platform of claim 3, wherein said platform further comprises an air cushion support including an opening adapted to have said exhaust tube fitted therein and allow air from said portable vacuum and shredder apparatus to pass therethrough forming an air cushion zone between said air cushion support and a ground surface.

5. The platform of claim 4, wherein said air cushion support further includes a plurality of wheels between said air cushion support and said ground surface.

6. A combination of a portable vacuum and shredder apparatus and an apparatus for integrating said portable vacuum and shredder apparatus with a collection system, said combination comprising a portable vacuum and shredder apparatus including a vacuum, a vacuum tube, a shredder, and a shredder tube; and an apparatus for integrating said portable vacuum and shredder apparatus with a collection system comprising a platform including at least two of three brackets located on an upper surface of said platform, one bracket being adapted to hold a portion of a vacuum tube of said portable vacuum and shredder apparatus, a second bracket being adjustable and adapted to hold a second portion of said vacuum tube of said portable vacuum and shredder apparatus, and a third bracket adapted to hold a separate portion of said portable vacuum and shredder apparatus, to thereby securely and removably hold said portable vacuum and shredder apparatus to said platform; said platform further comprising an ingress opening adapted for allowing the passage of shredded matter to pass from said portable vacuum and shredder apparatus to a collection member.

7. The platform of claim 6, wherein said platform further comprises a frame member removably connected to said platform, said frame member includes a top frame portion, a bottom frame portion, and a vertical frame portion connected between said top and bottom frame portions; and at least one releasable attachment member connected to said vertical frame portion and adapted to releasably attach said platform to a transportation member.

8. The platform of claim 6, wherein said platform further comprises an exhaust opening adapted to receive an exhaust tube for allowing air to flow from said collection member out through said exhaust opening; and an exhaust tube fitted within said exhaust opening and including a filter member therein to allow air to pass therethrough without shredded material therein.

9. The platform of claim 8, wherein said platform further comprises an air cushion support including an opening adapted to have said exhaust tube fitted therein and allow air from said portable vacuum and shredder apparatus to pass therethrough forming an air cushion zone between said air cushion support and a ground surface.

10. The platform of claim 9, wherein said air cushion support further includes a plurality of wheels between said air cushion support and said ground surface.

11. A combination of a portable vacuum and shredder apparatus, an apparatus for integrating said portable vacuum and shredder apparatus to a collection system, and a collection system, said combination comprising a portable vacuum and shredder apparatus including a vacuum, a vacuum tube, a shredder, and a shredder tube; an apparatus for integrating said portable vacuum and shredder apparatus to a collection system comprising at least two of three brackets located on an upper surface of said platform, one bracket being adapted to hold a portion of a vacuum tube of said portable vacuum and shredder apparatus, a second bracket being adjustable and adapted to hold a second portion of said vacuum tube of said portable vacuum and shredder apparatus, and wherein a third bracket can be elected to hold a separate portion of said portable vacuum and shredder apparatus, to thereby securely and removably hold said portable vacuum and shredder apparatus to said platform; said platform further comprising an ingress opening adapted for allowing the passage of shredded matter to pass from said portable vacuum and shredder apparatus to a collection member; and a collection system removably attached to a lower surface of said platform and comprising a collection member adapted to collect and retain shredded material therein.

12. The platform of claim 11, wherein said platform further comprises a frame member removably connected to said platform, said frame member includes a top frame portion, a bottom frame portion, and a vertical frame portion connected between said top and bottom frame portions; and at least one releasable attachment member connected to said vertical frame portion and adapted to releasably attach said platform to a transportation member.

13. The platform of claim 11, wherein said platform further comprises an exhaust opening adapted to receive an exhaust tube for allowing air to flow from said collection member out through said exhaust opening; and an exhaust tube fitted within said exhaust opening and including a filter member therein to allow air to pass therethrough without shredded material therein.

14. The platform of claim 13, wherein said platform further comprises an air cushion support including an opening adapted to have said exhaust tube fitted therein and allow air from said portable vacuum and shredder apparatus to pass therethrough forming an air cushion zone between said air cushion support and a ground surface.

15. The platform of claim 14, wherein said air cushion support further includes a plurality of wheels between said air cushion support and said ground surface.

16. The platform of claim 11, wherein said collection member is chosen from a group of collection members including a bag, a wheelbarrow, and a trailer.

* * * * *